(12) United States Patent
Namba et al.

(10) Patent No.: US 11,205,790 B2
(45) Date of Patent: Dec. 21, 2021

(54) FUEL CELL SYSTEM AND METHOD OF CONTROLLING THE SAME

(71) Applicant: TOYOTA JIDOSHA KABUSHIKI KAISHA, Toyota (JP)

(72) Inventors: Ryoichi Namba, Okazaki (JP); Yusuke Katayama, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 168 days.

(21) Appl. No.: 16/140,773

(22) Filed: Sep. 25, 2018

(65) Prior Publication Data

US 2019/0140290 A1    May 9, 2019

(30) Foreign Application Priority Data

Nov. 9, 2017    (JP) .............................. JP2017-216003

(51) Int. Cl.
| | | |
|---|---|---|
| *H01M 8/04111* | (2016.01) | |
| *H01M 8/0438* | (2016.01) | |
| *H01M 8/04537* | (2016.01) | |
| *H01M 8/043* | (2016.01) | |
| *H01M 8/04664* | (2016.01) | |
| *H01M 8/04082* | (2016.01) | |
| *H01M 8/04746* | (2016.01) | |

(Continued)

(52) U.S. Cl.
CPC ........ *H01M 8/04111* (2013.01); *H01M 8/043* (2016.02); *H01M 8/04201* (2013.01); *H01M 8/04425* (2013.01); *H01M 8/04559* (2013.01); *H01M 8/04686* (2013.01); *H01M 8/04753* (2013.01); *H01M 8/04776* (2013.01); *H01M 8/2465* (2013.01); *H01M 2008/1095* (2013.01); *H01M 2250/20* (2013.01)

(58) Field of Classification Search
None
See application file for complete search history.

(56) References Cited

U.S. PATENT DOCUMENTS

| | | |
|---|---|---|
| 2012/0171585 A1 | 7/2012 | Mueller et al. |
| 2016/0126566 A1* | 5/2016 | Iio ..................... H01M 8/04753 429/444 |
| 2017/0047602 A1 | 2/2017 | Sato |

FOREIGN PATENT DOCUMENTS

| | | |
|---|---|---|
| CN | 107078320 A | 8/2017 |
| JP | 2012-089236 A | 5/2012 |
| JP | 2012-089523 | 5/2012 |

(Continued)

*Primary Examiner* — Tracy M Dove
(74) *Attorney, Agent, or Firm* — Finnegan, Henderson, Farabow, Garrett & Dunner, LLP (57) ABSTRACT

A fuel cell system includes a cathode gas supply passage through which cathode gas is supplied to the fuel cell stack, a cathode gas discharge passage through which the cathode gas is discharged from the fuel cell stack, a turbo compressor provided in the cathode gas supply passage for delivering the cathode gas to the fuel cell stack, a valve provided in the cathode gas supply passage or the cathode gas discharge passage, and a controller that controls constituent components of the fuel cell system including the turbo compressor and the valve. The controller performs cathode-gas flow rate change control to alternately open and close the valve, in a condition where the turbo compressor is driven, when the fuel cell stack is not required to generate electric power.

10 Claims, 7 Drawing Sheets

(51) Int. Cl.
*H01M 8/2465* (2016.01)
*H01M 8/1018* (2016.01)

(56) References Cited

FOREIGN PATENT DOCUMENTS

| | | |
|---|---|---|
| JP | 2012-134166 | 7/2012 |
| JP | 2013-501324 A | 1/2013 |
| JP | 2013-105534 | 5/2013 |
| JP | 2016-091833 A | 5/2016 |
| JP | 2016-136496 | 7/2016 |

* cited by examiner

FUEL CELL SYSTEM AND METHOD OF CONTROLLING THE SAME

INCORPORATION BY REFERENCE

The disclosure of Japanese Patent Application No. 2017-216003 filed on Nov. 9, 2017 including the specification, drawings and abstract is incorporated herein by reference in its entirety.

BACKGROUND

1. Technical Field

The disclosure relates to a fuel cell system and a method of controlling the fuel cell system.

2. Description of Related Art

In a fuel cell system described in Japanese Unexamined Patent Application Publication No. 2012-89523 (JP 2012-89523 A), when a fuel cell stack is in a condition where electric power generation is stopped, cathode gas is intermittently supplied from an air compressor to the fuel cell stack, even during stop of power generation, so as to prevent the fuel cell stack from being unable to quickly respond to a request to generate electric power. In this manner, the voltage of a unit cell (which will be called "cell voltage") is kept equal to or larger than a given value.

SUMMARY

In the system described in JP 2012-89523 A, supply of cathode gas to the fuel cell stack and stop of the supply cannot be performed in short cycles, because of large inertia of the air compressor, and the amount of variation in the cell voltage may be increased.

A fuel cell system according to a first aspect of the disclosure includes a fuel cell stack, a cathode gas supply passage through which cathode gas is supplied to the fuel cell stack, a cathode gas discharge passage through which the cathode gas is discharged from the fuel cell stack, a turbo compressor provided in the cathode gas supply passage and configured to deliver the cathode gas to the fuel cell stack, a valve provided in the cathode gas supply passage or the cathode gas discharge passage, and a controller configured to control constituent components of the fuel cell system including the turbo compressor and the valve. The controller is configured to perform cathode-gas flow rate change control to alternately open and close the valve, in a condition where the turbo compressor is driven, when the fuel cell stack is not required to generate electric power. In the fuel cell system of this aspect, supply of the cathode gas to the fuel cell stack and stop of the supply can be performed in short cycles, so that the amount of variation in the voltage of the cell stack can be reduced. Also, the fuel cell system uses the turbo compressor, and the amount of cathode gas supplied by the turbo compressor is reduced with increase in the pressure between the turbo compressor and the valve at the time of closing of the valve. Therefore, the pressure between the turbo compressor and the valve is less likely or unlikely to excessively rise, as compared with the case where a compressor of a volume compression type, such as roots type, is used.

In the fuel cell system according to the above aspect, the flow rate of the cathode gas delivered by the turbo compressor when the fuel cell stack is not required to generate electric power is smaller than the flow rate of the cathode gas delivered when the fuel cell stack is required to generate electric power. With the fuel cell system thus configured, the fuel efficiency is improved, as compared with the case where the flow rate of the cathode gas delivered by the turbo compressor when the fuel cell stack is not required to generate electric power is equal to the flow rate in the case where the fuel cell stack is required to generate electric power.

In the fuel cell system, the valve may be provided downstream of the turbo compressor in the cathode gas supply passage, or provided in the cathode gas discharge passage, and the turbo compressor may include a rotating body housing that houses a rotating body that delivers the cathode gas, a motor housing that houses a motor that drives the rotating body, a part of the motor housing being filled with oil, and a mechanical seal that inhibits the oil from seeping from the rotating body housing into the motor housing. With the fuel cell system thus configured, the turbo compressor provided with the mechanical seal can achieve high-speed rotation of the rotating body, and the pressure in the rotating body housing increases to be higher than the pressure in the motor housing when the valve is closed, so that the oil can be made less likely or unlikely to seep from the motor housing into the rotating body housing.

The fuel cell system may further include a voltage detector configured to detect a voltage of the fuel cell stack. The controller is configured to control the valve to increase the voltage when the voltage is smaller than a predetermined target voltage, and control the valve to reduce the voltage when the voltage is larger than the target voltage. With the fuel cell system thus configured, control can be simplified, as compared with the case where the target voltage based on which the voltage is increased and the target voltage based on which the voltage is reduced are set to different values.

The fuel cell system may further include a voltage detector configured to detect a voltage of the fuel cell stack. The valve may be provided in the cathode gas supply passage, and the controller may be configured to (i) determine that the valve malfunctions, when the voltage does not become smaller than a predetermined test voltage before a predetermined time elapses, after a command to close the valve in the condition where the turbo compressor is driven is generated when no electric power is required to be generated by the fuel cell stack, and (ii) determine that the valve is normal, when the voltage becomes smaller than the test voltage before the predetermined time elapses, and then perform the cathode-gas flow rate change control. With the fuel cell system thus configured, a malfunction of the valve provided in the cathode gas supply passage can be determined.

A second aspect of the present disclosure relates to a method of controlling a fuel cell system including a fuel cell stack, a turbo compressor that delivers cathode gas to the fuel cell stack, and a valve provided in a cathode gas supply passage or a cathode gas discharge passage of the fuel cell stack. The method of controlling a fuel cell system including performing cathode-gas flow rate change control to alternately open and close the valve in a condition where the turbo compressor is driven, when the fuel cell stack is not required to generate electric power.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

Figure 1:
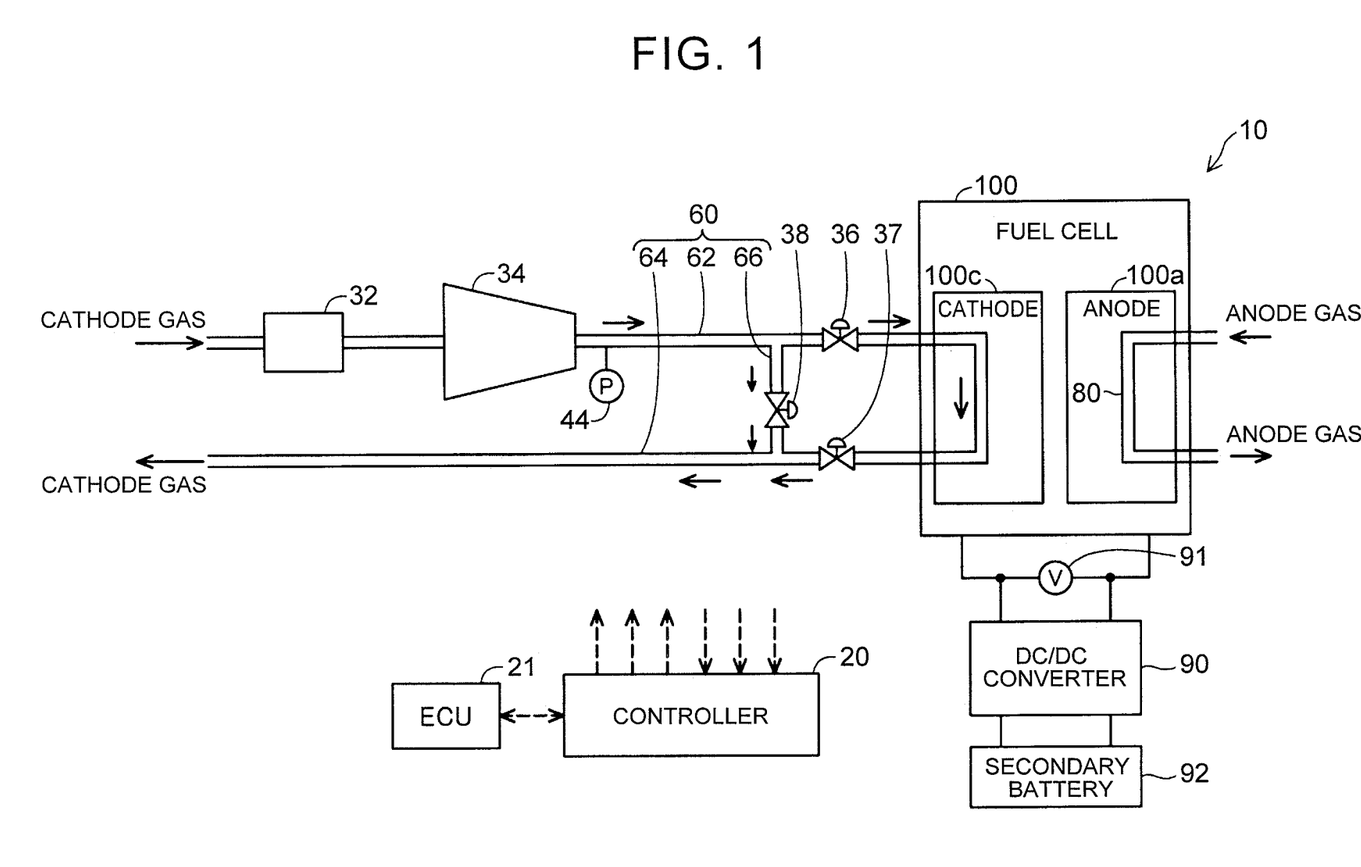
FIG. 1 is a schematic view showing a fuel cell system as one embodiment of the disclosure.

FIG. 1 shows a fuel cell system 10 as one embodiment of the disclosure. The fuel cell system 10 is installed on a fuel cell vehicle, for example. In this embodiment, the fuel cell system 10 includes a fuel cell stack 100, controller 20, air flow meter 32, turbo compressor 34, cathode gas passage 60, and anode gas passage 80.

The fuel cell stack 100 is a polymer electrolyte fuel cell that is supplied with anode gas (e.g., hydrogen gas) and cathode gas (e.g., air) as reaction gases, to generate electric power. The fuel cell stack 100 is composed of a plurality of unit cells (not shown) stacked together. The anode gas is supplied from an anode gas tank (not shown), and passes through the anode gas passage 80, to be supplied to an anode 100a of the fuel cell stack 100 and used for electrochemical reaction. A portion of the anode gas which was not used for electrochemical reaction is discharged as offgas to the outside of the fuel cell stack 100. On the other hand, the cathode gas is supplied to a cathode 100c of the fuel cell stack 100, through the cathode gas passage 60, and used for electrochemical reaction. Oxygen that was not used for electrochemical reaction is discharged as offgas to the outside of the fuel cell stack 100.

Through the cathode gas passage 60, the cathode gas is supplied to and discharged from the fuel cell stack 100. The cathode gas passage 60 includes a cathode gas supply passage 62 through which the cathode gas is supplied to the fuel cell stack 100, a cathode gas discharge passage 64 through which the cathode gas is discharged from the fuel cell stack 100, and a bypass passage 66 that communicates with the cathode gas supply passage 62 and the cathode gas discharge passage 64.

The air flow meter 32, turbo compressor 34, and a pressure gauge 44 are provided, in this order as viewed from the upstream side, in the cathode gas supply passage 62. The air flow meter 32 is a device that measures the flow rate of cathode gas taken into the cathode gas supply passage 62. The pressure gauge 44 measures the pressure at the downstream side of the turbo compressor 34. In this embodiment, the pressure gauge 44 is provided upstream of a portion of the cathode gas supply passage 62 connected to the bypass passage 66, and downstream of the turbo compressor 34. However, the pressure gauge 44 may be provided downstream of the fuel cell stack 100, in a portion of the cathode gas discharge passage 64 which is on the upstream side of its portion connected to the bypass passage 66.

The turbo compressor 34 is a turbo-type compressor that delivers cathode gas to the fuel cell stack 100. The turbo air compressor is characterized in that the flow rate of cathode gas delivered by the compressor can be changed within a wide range.

Figure 2:
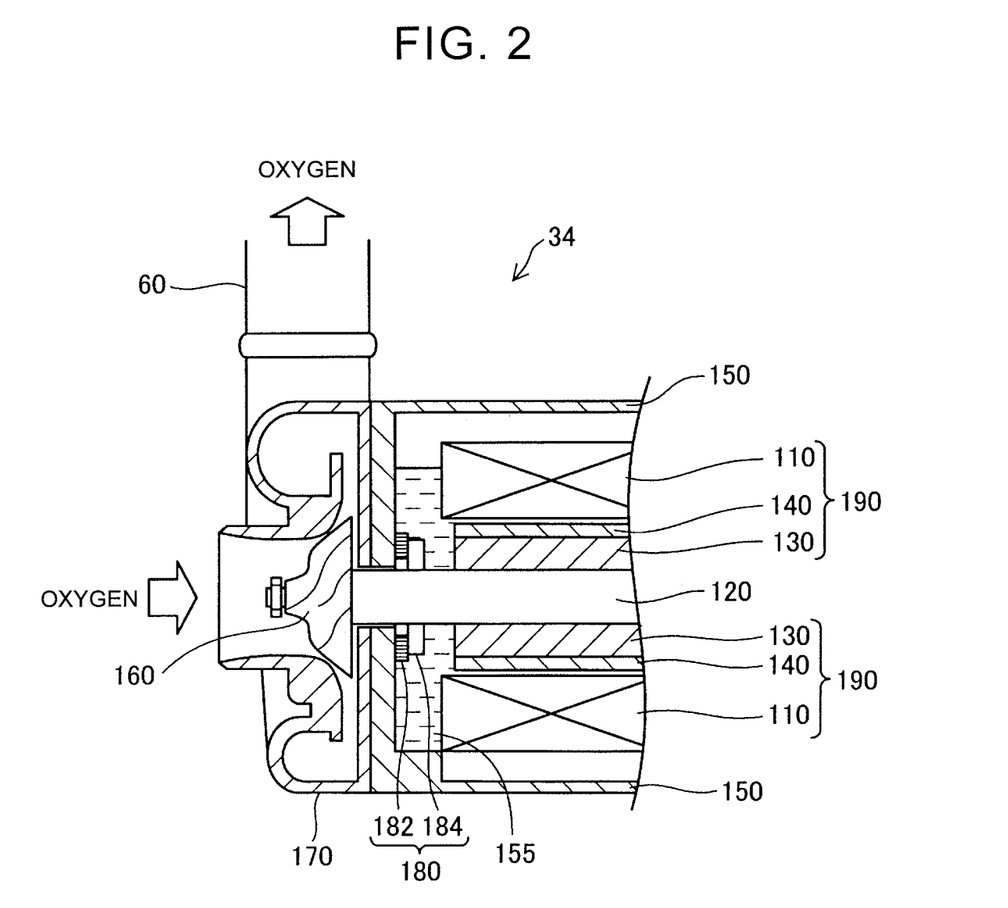
FIG. 2 is a schematic cross-sectional view showing a turbo compressor.

FIG. 2 shows the turbo compressor 34. The turbo compressor 34 includes a shaft 120, rotating body 160 mounted on the shaft 120, rotating body housing 170 in which the rotating body 160 is housed, motor 190 that drives the rotating body 160, and motor housing 150 in which the motor 190 is housed. In this embodiment, an impeller is used as the rotating body 160, but a gear, for example, may be used. In this embodiment, the motor 190 includes a solenoid 110, rotor 130, and magnet 140.

A part of the motor housing 150 is filled with oil 155. In this embodiment, a part of the motor housing 150 is filled with lubricating oil. The lubricating oil in the motor housing 150 is circulated in the motor housing 150, by means of a pump (not shown). The turbo compressor 34 also includes a mechanical seal 180 that inhibits the lubricating oil from seeping from the motor housing 150 into the rotating body housing 170.

The mechanical seal 180 includes a fixed ring 182 and a rotating ring 184. The fixed ring 182 is fixed to the motor housing 150. The rotating ring 184 is fixed to the shaft 120. When the shaft 120 rotates, the rotating ring 184 rotates, but the fixed ring 182 does not rotate. Therefore, when the shaft 120 rotates, the fixed ring 182 and the rotating ring 184 slide against each other, while keeping a micron-order clearance between the fixed ring 182 and the rotating ring 184. Thus, the lubricating oil included in the motor housing 150 is substantially prevented from leaking from between the fixed ring 182 and the rotating ring 184, into the rotating body housing 170, while high-speed rotation of the shaft 120 is achieved.

As shown in FIG. 1, the cathode gas passage 60 is provided with a plurality of valves. In this specification, "valve" means a component that changes the cross-sectional area of a passage. In this embodiment, an inlet valve 36, pressure regulating valve 37, and bypass valve 38 are provided in the cathode gas passage 60. The pressure regulating valve 37 controls the pressure of cathode gas at the downstream side of the fuel cell stack 100. The pressure regulating valve 37 is provided in the cathode gas discharge passage 64, and is located upstream of its portion connected to the bypass passage 66, and downstream of the fuel cell stack 100. The bypass valve 38 is provided in the bypass passage 66, for controlling the amount of cathode gas that passes through the bypass passage 66.

The inlet valve 36 controls the amount of cathode gas that enters the fuel cell stack 100. The inlet valve 36 is provided in the cathode gas supply passage 62, and is located between the fuel cell stack 100 and the turbo compressor 34. In this embodiment, the inlet valve 36 is located downstream of a portion of the cathode gas supply passage 62 connected to the bypass passage 66, and upstream of the fuel cell stack 100.

Electric power generated by the fuel cell stack 100 is stored in a secondary battery 92 via a DC/DC converter 90. Various loads (not shown) are connected to a power supply circuit including the fuel cell stack 100, DC/DC converter 90, and secondary battery 92. The fuel cell stack 100 and the secondary battery 92 can also supply electric power to the turbo compressor 34 and various valves.

A voltage detector 91 detects the voltage (which will also be called "FC voltage") of the fuel cell stack 100. In this embodiment, the average cell voltage is used as the FC voltage. The "average cell voltage" is a value obtained by dividing a voltage across the opposite ends of the fuel cell stack 100 by the number of unit cells. As the FC voltage, the voltage across the opposite ends of the fuel cell stack 100 may be used, or the lowest cell voltage may be used, or the highest cell voltage may be used. However, variation in the cell voltage among respective unit cells tends to be larger with time, in a zero required output operating mode (which will be described later); therefore, the voltage across the opposite ends of the fuel cell stack 100 or the average cell voltage is preferably used as the FC voltage.

The controller 20 is configured as a computer including a central processing unit (CPU), a memory, and an interface circuit to which the above components are connected. The controller 20 outputs signals for controlling start and stop of constituent components including the turbo compressor 34 and the inlet valve 36 in the fuel cell system 10, according to commands of an electronic control unit (ECU) 21. The ECU 21 is a controller that controls the whole system including the fuel cell system 10. In the fuel cell vehicle, for example, the ECU 21 controls the vehicle, according to a plurality of input values, such as the amount of depression of an accelerator pedal, the amount of depression of a brake pedal, and the vehicle speed. The ECU 21 may be included as a part of functions of the controller 20. The CPU executes control programs stored in the memory, so as to control power generation by the fuel cell system 10, and implement cathode-gas flow rate change control that will be described later.

The ECU 21 switches the operating mode of the fuel cell stack 100 between a normal operating mode and a zero required output operating mode, for example. In the normal operating mode, the fuel cell system 10 receives a power generation request from the ECU 21, and the fuel cell system 10 performs operation according to the power requirement. In the zero required output operating mode, the electric power which the ECU 21 requires the fuel cell system 10 to generate is equal to or smaller than a predetermined value, and the fuel cell stack 100 is not required to generate electric power. The ECU 21 switches the operating mode of the fuel cell system 10, from the normal operating mode to the zero required output operating mode, at the time of stop of the vehicle on which the fuel cell system 10 is installed, or during low-load operation, such as during traveling at a low speed. In the zero required output operating mode, the ECU 21 causes the secondary battery to supply electric power. In the zero required output operating mode, the controller 20 supplies oxygen to the fuel cell stack 100, to such an extent that the voltage of the fuel cell stack 100 falls within a predetermined range. In this embodiment, the controller 20 controls each part of the fuel cell system 10, to perform cathode-gas flow rate change control (which will be described later), in the zero required output operating mode.

Figure 3:
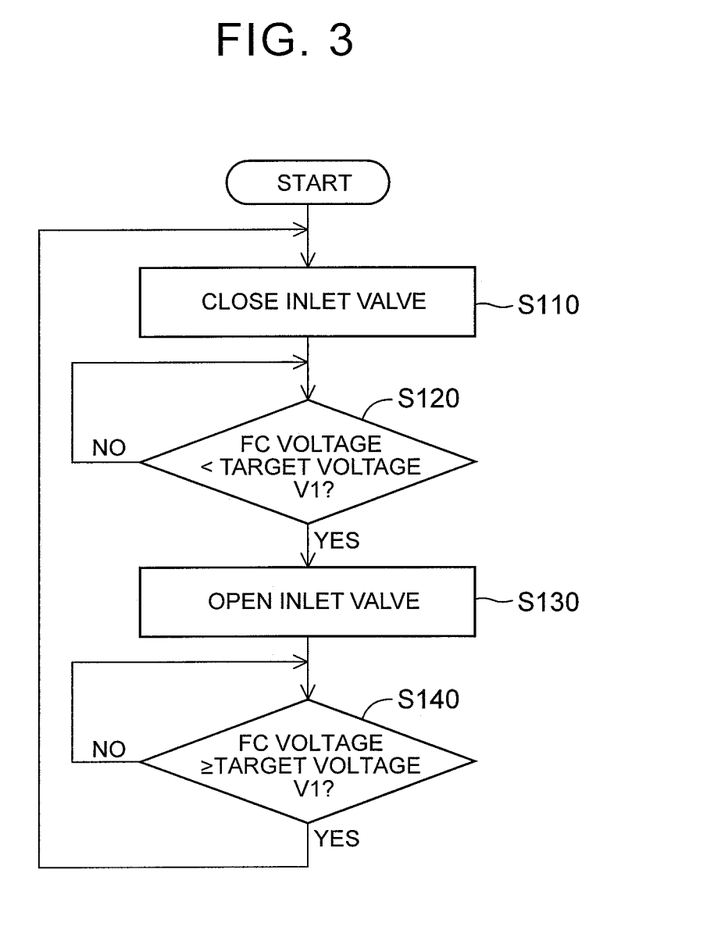
FIG. 3 is a flowchart of cathode-gas flow rate change control executed by a controller.

FIG. 3 is a flowchart of cathode-gas flow rate change control executed by the controller 20. When the fuel cell stack 100 starts operating in the zero required output operating mode, the controller 20 starts the cathode-gas flow rate change control. The controller 20 finishes control of FIG. 3, when it receives a command to stop operation in the zero required output operating mode, more specifically, when the ECU 21 requires the fuel cell stack 100 to generate electric power. Under the cathode-gas flow rate change control, the controller 20 stops supply of anode gas, places the pressure regulating valve 37 in an open state, and places the bypass valve 38 in a closed state, while keeping the turbo compressor 34 in a driven state.

The flow rate of cathode gas delivered by the turbo compressor 34 when the fuel cell stack 100 is not required to generate electric power is preferably smaller than the flow rate of cathode gas delivered when the fuel cell stack 100 is required to generate electric power. In this manner, the FC voltage can be made less likely to rise rapidly. Here, the flow rate of cathode gas can be measured by the air flow meter 32.

In this embodiment, the flow rate of cathode gas delivered by the turbo compressor 34 when the fuel cell stack 100 is not required to generate electric power is equal to or larger than 0.5 NL/min., and equal to or smaller than 30 NL/min. Preferably, the flow rate is equal to or larger than 3 NL/min, and is equal to or smaller than 14 NL/min. On the other hand, in this embodiment, the flow rate of cathode gas delivered when the fuel cell stack 100 is required to generate electric power is equal to or larger than 150 NL/min., and is equal to or smaller than 5000 NL/min. In this connection, 1 NL/min means that cathode gas flows in an amount of 1 L per minute, under base conditions (pressure: 0.1013 MPa, temperature: 0° C., humidity: 0%).

In this embodiment, the flow rate of cathode gas delivered by the turbo compressor 34 when the fuel cell stack 100 is not required to generate electric power is equal to or smaller than 1% of the maximum flow rate of cathode gas delivered when the fuel cell stack 100 is required to generate electric power. As a result, the FC voltage can be effectively made less likely to rise rapidly, and therefore, the durability of the fuel cell stack 100 is improved.

When the cathode-gas flow rate change control is started, the controller 20 initially closes the inlet valve 36 (step S110). Here, "to close the inlet valve 36" means reducing the degree of opening of the inlet valve 36 to be smaller than that in a condition where the inlet valve 36 is open in step S130 that will be described later. In this embodiment, the controller 20 completely shuts off the cathode gas supply passage 62 using the inlet valve 36. However, the disclosure is not limited to this arrangement, but it is only required to reduce the degree of opening to be smaller than that in the condition where the inlet valve 36 is open in step S130 that will be described later. Here, "the degree of opening" means the percentage (%) obtained by dividing the opening area of a valve body portion by the maximum opening area of the valve body portion. For example, in step S110, the degree of opening of the inlet valve 36 may be set to 50% or less of the degree of opening in step S130.

Next, the controller 20 determines whether the FC voltage is smaller than the target voltage V1 (step S120). In this embodiment, the target voltage V1 is a voltage that can ensure sufficient output response, while curbing deterioration of the fuel cell stack 100, and is obtained in advance by experiment or simulation. In this embodiment, the controller 20 stores the target voltage V1 in advance. The FC voltage is detected by the voltage detector 91.

When the controller 20 determines that the FC voltage is equal to or larger than the target voltage V1 (step S120: NO), the control returns to step S120. On the other hand, when the controller 20 determines that the FC voltage is smaller than the target voltage V1 (step S120: YES), the controller 20 opens the inlet valve 36, so as to supply the fuel cell stack 100 with cathode gas (step S130). Here, "to open the inlet valve 36" means increasing the degree of opening to be larger than that in a condition of step S110 where the inlet valve 36 is closed. In this embodiment, the controller 20 maximizes the opening area of the valve body portion of the inlet valve 36 in step S130. However, the disclosure is not limited to this arrangement, but it is only required to increase the degree of opening to be larger than that in the condition of step S110 where the inlet valve 36 is closed. During the cathode-gas flow rate change control, each period over which the controller 20 places the inlet valve 36 in the open state so as to supply cathode gas to the fuel cell stack 100 will be called "supply period P1". On the other hand, during the cathode-gas flow rate change control, each period over which the controller 20 places the inlet valve 36 in the closed state so as to stop supply of cathode gas to the fuel cell stack 100 will be called "stop period P2".

After the inlet valve 36 is opened (step S130), the controller 20 determines whether the FC voltage is equal to or larger than the target voltage V1 (step S140). When the controller 20 determines that the FC voltage is smaller than the target voltage V1 (step S140: NO), the control returns to step S140. On the other hand, when the controller 20 determines that the FC voltage is equal to or larger than the target voltage V1 (step S140: YES), the control returns to step S110, and the controller 20 closes the inlet valve 36. The controller 20 repeats the above-described series of steps, until the zero required output operating mode ends.

Figure 4:
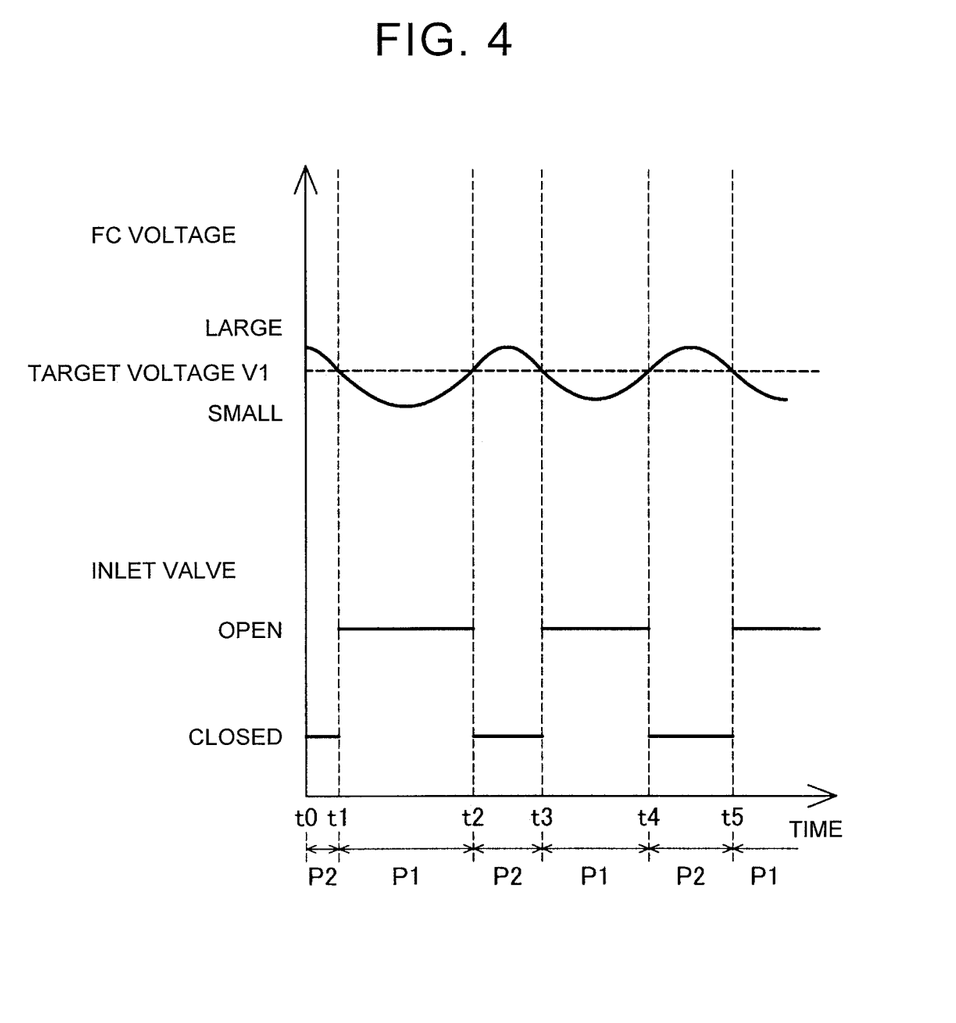
FIG. 4 is a timing chart showing one example of the cathode-gas flow rate change control.

The timing chart of FIG. 4 shows an example of the cathode-gas flow rate change control. In FIG. 4, the horizontal axis indicates time, and the vertical axis indicates change of the FC voltage in the upper section, and the open/closed state of the inlet valve 36 in the lower section. In FIG. 4, a period of a part of the cathode-gas flow rate change control is indicated.

In this embodiment, from time t0 to time t1, the controller 20 places the inlet valve 36 in the closed state, so as to stop supply of cathode gas to the fuel cell stack 100.

Then, from time t1 to time t2, the FC voltage is smaller than the target voltage V1; therefore, the controller 20 places the inlet valve 36 in the open state, so as to supply cathode gas to the fuel cell stack 100. Here, the period from time t1 to time t2 is the supply period P1 in which the controller 20 places the inlet valve 36 in the open state, so as to supply cathode gas to the fuel cell stack 100.

Then, in a period from time t2 to time t3, the FC voltage is equal to or larger than the target voltage V1; therefore, the controller 20 places the inlet valve 36 in the closed state, so as to stop supply of cathode gas to the fuel cell stack 100. Namely, the period from time t2 to time t3 is the stop period P2 in which the controller 20 places the inlet valve 36 in the closed state, so as to stop supply of cathode gas to the fuel cell stack 100.

Similarly, a period from time t3 to time t4 is the supply period P1, and a period from time t4 to time t5 is the stop period P2. In this embodiment, one cycle including one supply period P1 and one stop period P2 is equal to or longer than two seconds, and is equal to or shorter than five seconds.

As described above, in the period in which the fuel cell stack 100 is not required to generate electric power, the controller 20 controls the inlet valve 36 so that the supply period P1 and the stop period P2 appear alternately. Namely, in the period in which the fuel cell stack 100 is not required to generate electric power, the controller 20 alternately switches the inlet valve 36 between the open state and the closed state. In this manner, the FC voltage can be controlled to be larger than 0 V, and smaller than an open circuit voltage at the time when the fuel cell stack 100 generates power. As a result, a catalyst in the fuel cell stack 100 is less likely to deteriorate due to excessive increase of the FC voltage, and the fuel cell stack 100 can quickly respond to a request to generate electric power when there is any such request.

While the supply period P1 is longer than the stop period P2 in this embodiment, as shown in FIG. 4, the supply period P1 may be equal to the stop period P2, or the supply period P1 may be shorter than the stop period P2. Before the fuel cell system 10 is brought into conditions shown in FIG. 4, there may be a stop period P2 that is longer than the supply period P1. Namely, before the initial supply period P1 starts, there may be a stop period P2 that is longer than the supply period P1.

In the fuel cell system 10 of this embodiment, when the fuel cell stack 100 is not required to generate electric power, the inlet valve 36 is alternately switched between the open state and the closed state, in a condition where the turbo compressor 34 is driven. Thus, in the fuel cell system 10, supply of cathode gas to the fuel cell stack 100 and stop of the supply can be performed in short cycles, so that the range of variation in the FC voltage can be reduced. If a volume compression type compressor, such as a roots type compressor, is used, in place of the turbo compressor 34, the flow rate of cathode gas supplied by the compressor is not reduced even if the inlet valve 36 is closed; therefore, the pressure between the inlet valve 36 and the compressor may increase extraordinarily when the inlet valve 36 is closed, and, consequently, the cathode gas supply passage 62 may be damaged. On the other hand, in the fuel cell system 10 of this embodiment, the turbo compressor 34 is used. Since the amount of cathode gas supplied by the turbo compressor 34 is reduced due to increase of the pressure between the turbo compressor 34 and the inlet valve 36 when the inlet valve 36 is closed, the pressure between the turbo compressor 34 and the inlet valve 36 can be made less likely or unlikely to increase excessively, as compared with the case where the volume compression type compressor, such as a roots type compressor, is used.

In the fuel cell system 10 of this embodiment, the flow rate of cathode gas in the case where the fuel cell stack 100 is not required to generate electric power is controlled by opening and closing the inlet valve 36. Thus, according to the fuel cell system 10, the flow rate of cathode gas can be quickly controlled, as compared with the case where the flow rate of cathode gas is controlled by the turbo compressor 34.

In the fuel cell system 10 of this embodiment, the flow rate of cathode gas delivered by the turbo compressor 34 in the supply period P1 is smaller than the flow rate in the case where the fuel cell stack 100 is required to generate electric power. Thus, the fuel efficiency can be improved, as compared with the case where the flow rate of cathode gas delivered by the turbo compressor 34 in the supply period P1 is made equal to the flow rate in the case where the fuel cell stack 100 is required to generate electric power. It is, however, to be noted that the flow rate of cathode gas delivered by the turbo compressor 34 in the supply period P1 may be larger than or equal to the flow rate in the case where the fuel cell stack 100 is required to generate electric power.

In the fuel cell system 10 of this embodiment, the mechanical seal 180 is used in the turbo compressor 34, so that the rotating body 160 of the turbo compressor 34 can rotate at a high speed. Generally, in the case where the mechanical seal 180 is used on the upstream side of an internal combustion engine, even if oil leaks from the mechanical seal 180, the oil burns in the internal combustion engine, and does not cause any problem. Meanwhile, when the mechanical seal 180 is provided on the upstream side of the fuel cell stack 100, oil that leaks from the mechanical seal may deteriorate the performance of the fuel cell stack 100. However, in the fuel cell system 10 of this embodiment, in which the inlet valve 36 is provided downstream of the turbo compressor 34 in the cathode gas passage 60, when the inlet valve 36 is closed, the pressure in the rotating body housing 170 of the turbo compressor 34 increases, to be higher than that in the motor housing 150 of the turbo compressor 34. As a result, in the fuel cell system 10 of this embodiment, oil is less likely or unlikely to seep from the motor housing 150 into the rotating body housing 170.

In the fuel cell system 10 of this embodiment, the supply period P1 is longer than the stop period P2. Therefore, the flowability of water vapor and water in the fuel cell stack 100 is improved, so that the environment within the fuel cell system 10 can be kept favorable.

In the fuel cell system 10 of this embodiment, the controller 20 controls the inlet valve 36 so as to increase the FC voltage, when the voltage of the fuel cell stack 100 is smaller than the predetermined target voltage V1, and controls the inlet valve 36 so as to reduce the FC voltage, when the voltage of the fuel cell stack 100 is larger than the target voltage V1. While the target voltage V1 used in step S120 and the target voltage V1 used in step S140 may be set to different values, control can be simplified when the target voltage V1 used in step S120 and the target voltage V1 used in step S140 are set to the same value, as in this embodiment.

B. Second Embodiment

Figure 5:
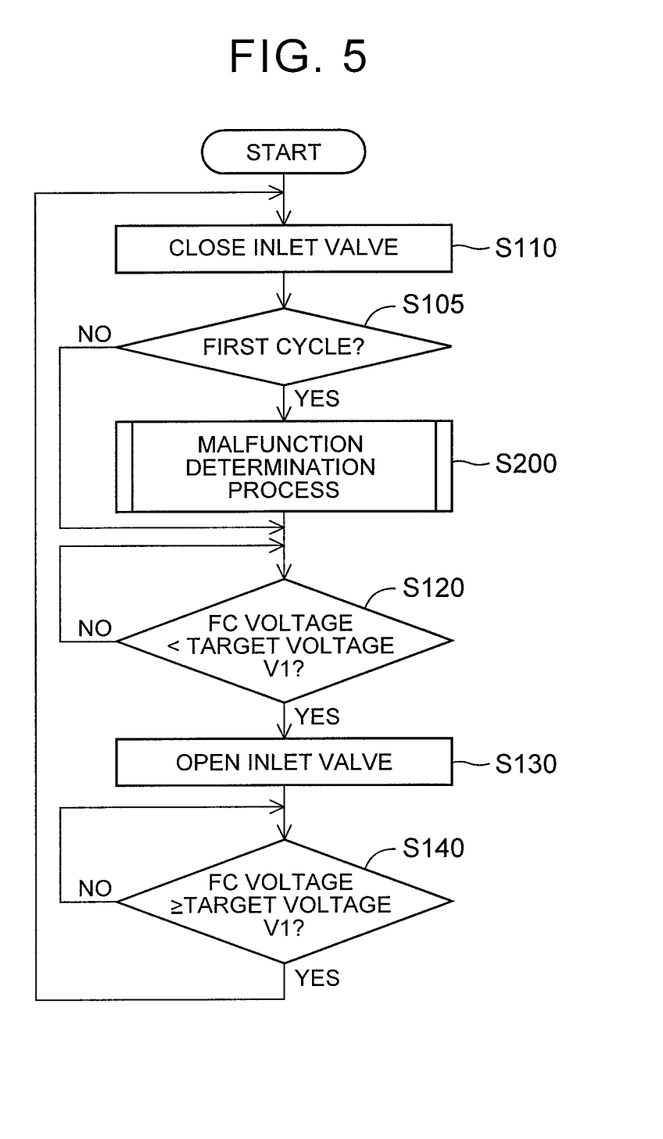
FIG. 5 is a flowchart of cathode-gas flow rate change control according to a second embodiment.

FIG. 5 is a flowchart of c cathode-gas flow rate change control according to a second embodiment. The second embodiment is different from the first embodiment in that step S105 and step S200 are additionally provided, but the first and second embodiments are identical with each other in other respects.

In the second embodiment, after the inlet valve 36 is closed (step S110), the controller 20 determines whether the operation to close the inlet valve 36 is performed for the first time under the current cathode-gas flow rate change control. When the operation to close the inlet valve 36 is performed for the first time under the current cathode-gas flow rate change control (step S105: YES), the controller 20 performs a malfunction determination process (step S200). On the other hand, when the operation to close the inlet valve 36 is not performed for the first time under the current cathode-gas flow rate change control (step S105: NO), the control proceeds to step S120.

Figure 6:
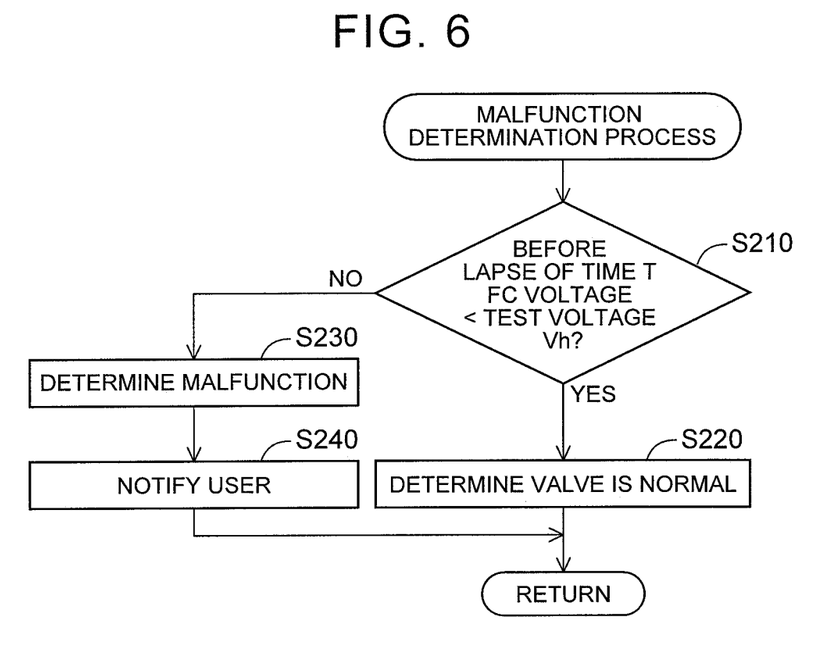
FIG. 6 is a flowchart of a malfunction determination process.

FIG. 6 is a flowchart of the malfunction determination process (step S200). In this process, the controller 20 determines whether the FC voltage becomes smaller than a predetermined test voltage Vh, in a period from the time when the controller 20 gives a command to close the inlet valve 36, to the time when a predetermined time T elapses (step S210). In this embodiment, the test voltage Vh is lower than the lowest voltage in the case where the fuel cell stack 100 is required to generate power, and is higher than the target voltage V1. The test voltage Vh is, for example, the average voltage of the lowest voltage in the case where the fuel cell stack 100 is required to generate power, and the target voltage V1, and is obtained in advance by experiment or simulation. The above-indicated time T is a length of time it is supposed to take for the FC voltage to be reduced down to the target voltage V1 when the inlet valve 36 is normally closed, for example. In this embodiment, the controller 20 stores the test voltage Vh and the time T in advance.

When the FC voltage becomes smaller than the predetermined test voltage Vh before the lapse of the time T (step S210: YES), the controller 20 determines that the inlet valve 36 is normal (step S220), and finishes the malfunction determination process.

On the other hand, when the FC voltage does not become smaller than the predetermined test voltage Vh before the lapse of the time T (step S210: NO), the controller 20 determines that the inlet valve 36 malfunctions (e.g., it is stuck in the open position) (step S230), and notifies the user of this fact, using voice or display via an output device (not shown) (step S240). Then, the controller 20 finishes the malfunction determination process. Instead of notifying the user of the malfunction, the operation to close the inlet valve 36 may be performed again, for example. In this embodiment, after the malfunction determination process ends, the control returns to step S120 (FIG. 5). However, when the controller 20 determines that the inlet valve 36 malfunctions, the controller 20 may finish the malfunction determination process, and also finish the cathode-gas flow rate change control. Then, the controller 20 may change the flow rate of cathode gas by means of the turbo compressor 34, in place of the inlet valve 36.

Figure 7:
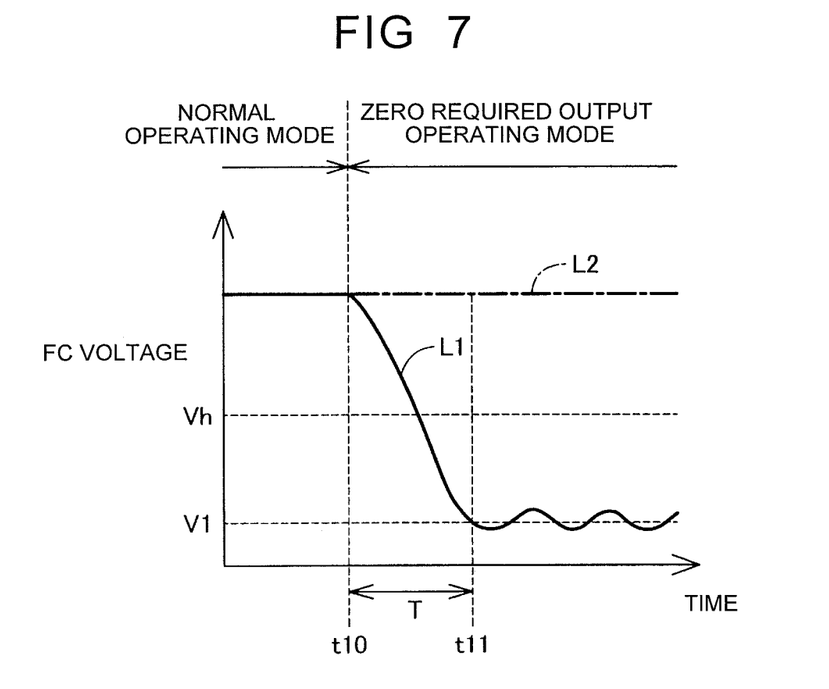
FIG. 7 is a graph useful for explaining the relationship between FC voltage and a malfunction of an inlet valve.

Referring to the graph of FIG. 7, the relationship between the FC voltage and a malfunction of the inlet valve 36 will be described. In FIG. 7, the vertical axis indicates the FC voltage, and the horizontal axis indicates time. In general, the inlet valve 36 is normally kept in the open state in the normal operating mode. Therefore, the inlet valve 36 may be stuck in the open state.

In this embodiment, after switching from the normal operating mode to the zero required output operating mode, the controller 20 gives a command to close the inlet valve 36. The inlet valve 36, if it is normal, closes in response to this command. Thus, as indicated by line L1 in FIG. 7, the FC voltage decreases with time, in a period (time T) from time t10 at which control to close the inlet valve 36 is performed, to time t11 at which the FC voltage becomes equal to the target voltage V1. As a result, the FC voltage becomes smaller than the test voltage Vh, by the time when the time T elapses, after the controller 20 gives the command to close the inlet valve 36.

On the other hand, when the inlet valve 36 is stuck in the open state, namely, when the inlet valve 36 malfunctions, the inlet valve 36 is not closed, even if the controller 20 gives the command to close the inlet valve 36. Therefore, the FC voltage does not decrease, as indicated by line L2 in FIG. 7, in the period from time t10 at which control to close the inlet valve 36 is performed, to the time when the time T elapses, and the FC voltage does not become smaller than the test voltage Vh, before the lapse of the time T.

In the second embodiment, malfunction determination control is performed, before the cathode-gas flow rate change control for alternately switching the inlet valve 36 between the open state and the closed state is performed. Namely, in the second embodiment, the malfunction determination control is performed, after the command to close the inlet valve 36 is generated in a condition where the turbo compressor 34 is driven, when no electric power is required to be generated by the fuel cell stack 100. In this manner, a malfunction of the inlet valve 36 can be determined.

C. Third Embodiment

Figure 8:
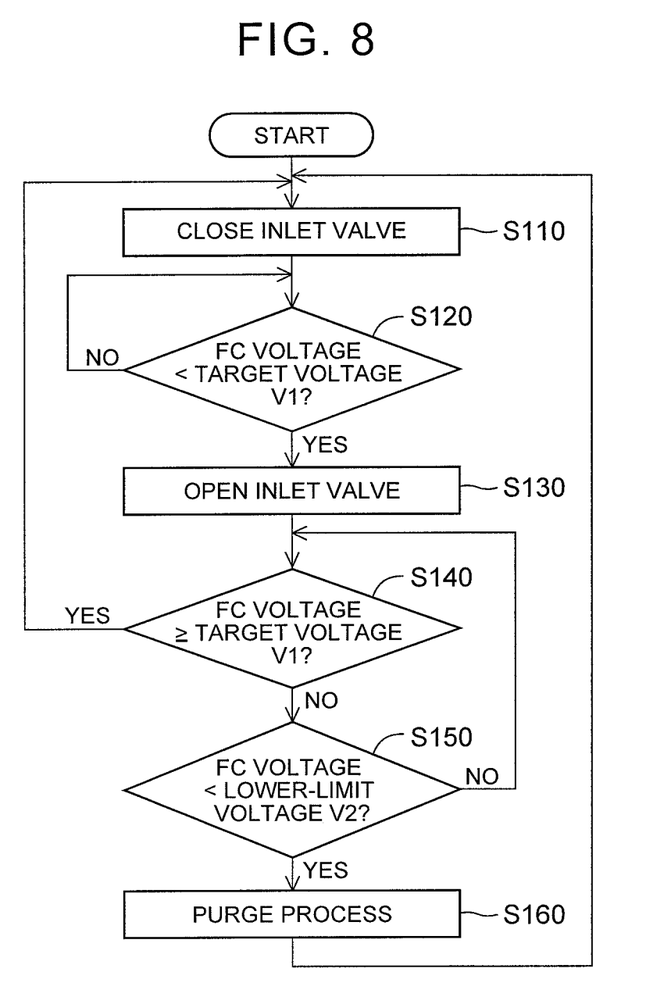
FIG. 8 is a flowchart of cathode-gas flow rate change control according to a third embodiment.

FIG. 8 is a flowchart of cathode-gas flow rate change control according to a third embodiment. The third embodiment is different from the first embodiment in that step S150 and step S160 are additionally provided, but is identical with the first embodiment in other respects.

In the third embodiment, when the controller 20 determines that the FC voltage is smaller than the target voltage V1 (step S140: NO), the controller 20 determines whether the FC voltage is smaller than a lower-limit voltage V2 (step S150). The lower-limit voltage V2 is a voltage at which the catalyst included in the fuel cell stack 100 switches between oxidation reaction and reduction reaction, for example, and is obtained in advance by experiment or simulation. In this embodiment, the controller 20 stores the lower-limit voltage V2 in advance. In this embodiment, the lower-limit voltage V2 is smaller than the target voltage V1.

When the controller 20 determines that the FC voltage is equal to or larger than the lower-limit voltage V2 (step S150: NO), the control returns to step S140. On the other hand, when the controller 20 determines that the FC voltage is smaller than the lower-limit voltage V2 (step S150: YES), the controller 20 performs a purge process (step S160). After the purge process (step S160), the control returns to step S110. Here, the purge process is performed so as to reduce water that exists in the cathode gas passage 60 within the fuel cell stack 100. In this embodiment, the cathode gas is supplied from the turbo compressor 34 to the fuel cell stack 100, at a flow rate that is 10 times as large as the flow rate of cathode gas delivered by the turbo compressor 34 in the supply period P1. In this embodiment, the purge process is performed for several seconds.

In the third embodiment, the purge process makes it possible to recover the FC voltage that was reduced due to water that exists in the cathode gas passage 60 within the fuel cell stack 100.

D. Other Embodiments

In the illustrated embodiments, when the fuel cell stack 100 is not required to generate electric power, the inlet valve 36 is alternately opened and closed, in the condition where the turbo compressor 34 is driven. However, the disclosure is not limited to this arrangement, but the pressure regulating valve 37 may be opened and closed, in place of the inlet valve 36. In this case, too, supply of cathode gas to the fuel cell stack 100 and stop of the supply can be performed in short cycles, so that the range of variation in the FC voltage can be reduced. However, it is preferable to control the rate of flow of cathode gas into the fuel cell stack 100 by opening and closing the inlet valve 36, rather than by opening and closing the pressure regulating valve 37, because the flow rate can be more quickly controlled by opening and closing the inlet valve 36. When the pressure regulating valve 37 is opened and closed, instead of the inlet valve 36, the FC voltage is increased by closing the pressure regulating valve 37, and the FC voltage is reduced by opening the pressure regulating valve 37.

In the illustrated embodiments, during operation in the zero required output operating mode, no current is generated from the fuel cell stack 100. However, the disclosure is not limited to this arrangement, but, for example, small current may be generated from the fuel cell stack 100. This case is also included in the zero required output operating mode.

In the illustrated embodiments, the inlet valve 36 is provided downstream of the turbo compressor 34 in the cathode gas supply passage 62, and the pressure regulating valve 37 is provided in the cathode gas discharge passage 64. However, the disclosure is not limited to this arrangement, but, for example, a valve may be provided upstream of the turbo compressor 34 in the cathode gas supply passage 62.

The present disclosure is not limited to the above embodiments, but may be implemented with various configurations, without departing from the scope thereof. For example, technical features in the embodiments, which correspond to technical features described in "SUMMARY", may be replaced with other features or combined as appropriate, so as to solve a part or the whole of the problems mentioned above, or achieve a part or the whole of the effects mentioned above. If there is any technical feature that is not described as being essential in this specification, the technical feature may be deleted as appropriate.

What is claimed is:

1. A fuel cell system comprising:
    a fuel cell stack;
    a cathode gas supply passage through which cathode gas is supplied to the fuel cell stack;
    a cathode gas discharge passage through which the cathode gas is discharged from the fuel cell stack;
    a turbo compressor provided in the cathode gas supply passage and configured to deliver the cathode gas to the fuel cell stack;
    an inlet valve provided in the cathode gas supply passage;
    a voltage detector configured to detect a voltage of the fuel cell stack; and
    a controller programmed to control constituent components of the fuel cell system including the turbo compressor and the inlet valve,
    wherein the controller is programmed to:
        determine that the fuel cell stack is not required to generate electric power, and
        perform cathode-gas flow rate change control when the fuel cell stack is determined to be not required to generate electric power, the cathode-gas flow rate change control comprising:
            when the voltage of the fuel cell stack is smaller than a predetermined target voltage, driving the inlet valve in an opening direction to increase the flow rate of the cathode gas while driving the turbo compressor to increase the voltage of the fuel cell stack, and
            when the voltage of the fuel cell stack is larger than the predetermined target voltage, driving the inlet valve in a closing direction to decrease the flow rate of the cathode gas while driving the turbo compressor to reduce the voltage of the fuel cell stack.

2. The fuel cell system according to claim 1, wherein the controller is programmed to:
    control a flow rate of the cathode gas delivered by the turbo compressor when the fuel cell stack is not required to generate electric power to be smaller than the flow rate of the cathode gas delivered when the fuel cell stack is required to generate electric power.

3. The fuel cell system according to claim 1, wherein:
    the inlet valve is provided downstream of the turbo compressor in the cathode gas supply passage; and
    the turbo compressor comprises:
        a rotating body housing that houses a rotating body that delivers the cathode gas;
        a motor housing that houses a motor that drives the rotating body, a part of the motor housing being filled with oil; and
        a mechanical seal that inhibits the oil from seeping from the motor housing into the rotating body housing.

4. The fuel cell system according to claim 1, wherein:
    the controller is programmed to:
        (i) determine that the inlet valve malfunctions, when the voltage of the fuel cell stack does not become smaller than a predetermined test voltage before a predetermined time elapses, after a command to drive the inlet valve in the closing direction in the condition where the turbo compressor is driven is generated when no electric power is required to be generated by the fuel cell stack, and (ii) determine that the inlet valve is normal, when the voltage of the fuel cell stack becomes smaller than the test voltage before the predetermined time elapses, and then perform the cathode-gas flow rate change control.

5. The fuel cell system according to claim 1, wherein the controller is programmed to control the turbo compressor to set a flow rate of the cathode gas delivered by the turbo compressor when the fuel cell stack is not required to generate electric power to a flow rate that is equal to or smaller than 1% of a maximum flow rate of the cathode gas delivered when the fuel cell stack is required to generate electric power.

6. A method of controlling a fuel cell system including a fuel cell stack, a turbo compressor that delivers cathode gas to the fuel cell stack, and an inlet valve provided in a cathode gas supply passage of the fuel cell stack, the method comprising:

determining that the fuel cell stack is not required to generate electric power; and performing cathode-gas flow rate change control when the fuel cell stack is determined to be not required to generate electric power, wherein the cathode-gas flow rate change control comprises:

when a voltage of the fuel cell stack is smaller than a predetermined target voltage, driving the inlet valve in an opening direction to increase the flow rate of the cathode gas while driving the turbo compressor to increase the voltage of the fuel cell stack; and when the voltage of the fuel cell stack is larger than the predetermined target voltage, driving the inlet valve in a closing direction to decrease the flow rate of the cathode gas while driving the turbo compressor to reduce the voltage of the fuel cell stack.

7. The fuel cell system according to claim 5, wherein the controller is programmed to drive the inlet valve in the closing direction at least twice during performance of the cathode-gas flow rate change control.

8. The fuel cell system according to claim 5, wherein driving the inlet valve in the closing direction during the cathode-gas flow rate change control comprises completely shutting off the cathode gas supply passage using the valve.

9. The method according to claim 6, wherein performing the cathode-gas flow rate change control comprises driving the inlet valve in the closing direction at least twice.

10. The method according to claim 6, wherein driving the inlet valve in the closing direction during the cathode-gas flow rate change control comprises completely shutting off the cathode gas supply passage using the valve.

* * * * *